United States Patent [19]
Cox

[11] Patent Number: 5,822,911
[45] Date of Patent: Oct. 20, 1998

[54] DUAL-USE FISHING LURE

[76] Inventor: Clifford W. Cox, P.O. Box 7000, Texarkana, Tex. 75505

[21] Appl. No.: 835,507

[22] Filed: Apr. 8, 1997

Related U.S. Application Data

[63] Continuation-in-part of Ser. No. 521,136, Aug. 29, 1995, abandoned.

[51] Int. Cl.$^6$ ............................ A01K 83/02; A01K 85/02
[52] U.S. Cl. ...................................... 43/37; 43/35
[58] Field of Search ............................................ 43/34–37

[56] References Cited

U.S. PATENT DOCUMENTS

| | | | |
|---|---|---|---|
| 151,394 | 5/1874 | Huard et al. | 43/35 |
| 1,209,237 | 12/1916 | Warren | 43/35 |
| 1,459,042 | 6/1923 | Wrege | 43/35 |
| 2,044,702 | 6/1936 | Kaylu | 43/36 |
| 2,295,042 | 9/1942 | Llewellyn | 43/35 |
| 2,439,391 | 4/1948 | Jobson | 43/37 |
| 2,590,752 | 3/1952 | Chaffee | 43/35 |
| 2,613,469 | 10/1952 | Haberkorn | 43/36 |
| 2,854,778 | 10/1958 | Polki | 43/35 |
| 3,059,371 | 10/1962 | Haynie, Sr. | 43/35 |
| 3,081,572 | 3/1963 | Tomsello | 43/37 |
| 4,176,489 | 12/1979 | Levstik | 43/35 |
| 4,528,770 | 7/1985 | McDiarmid | 43/35 |
| 5,440,830 | 8/1995 | Smith | 43/37 |

Primary Examiner—Michael J. Carone
Assistant Examiner—Darren Ark

[57] ABSTRACT

Improvements to fishing lures that utilize retractable hooks and moveable trigger rod having the following embodiments: a body of hard plastic, formed by injection molding, consisting of a left side and a right side. The outer body shape and appearance that of conventional lures, while internal shape and construction formed to house and protect hook and trigger mechanism. A left side containing a forward-looking trigger rod tube, a latching blade cavity, a friction-ridge release cavity, a friction ridge, a hook cavity, a slotted opening to exterior, and a rearward alignment dowel. A right side containing a forward-looking trigger rod tube, a latching blade cavity, a friction ridge release cavity, positioned directly above, a hook support post, a forward alignment dowel slot, an anchor arm cavity, a friction ridge, a hook cavity, a slotted opening to exterior, a rearward alignment dowel slot. A spring-biased hook with right-hand twist spring coil and a fifteen degree bend in a hook shank positioned over a support post in the right side of the body, a spring-biased hook with a left-hand twist spring coil and a fifteen degree bend in the hook shank, positioned over a support post in the left side of the body, a moveable trigger consisting of a trigger rod eye, a cylindrical trigger rod, a rectangular latching blade, a friction ridge traversing the entire width of the latching blade. Lures designed to dive below the water's surface will include all the above-stated embodiments plus: a moveable trigger consisting of a trigger rod eye, a diving bill or dish molded to a cylindrical trigger rod directly below the trigger rod eye, a rectangular latching blade, a friction ridge traversing the entire width of the latching blade.

5 Claims, 4 Drawing Sheets

VIEW A-A

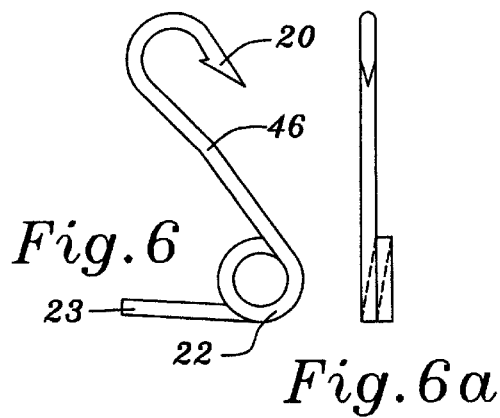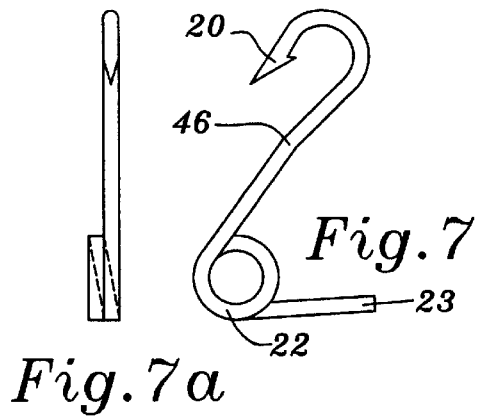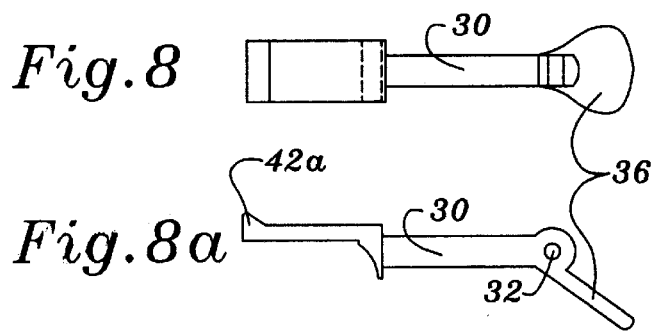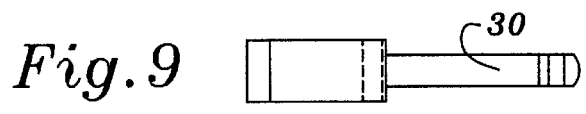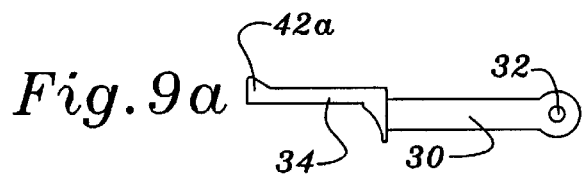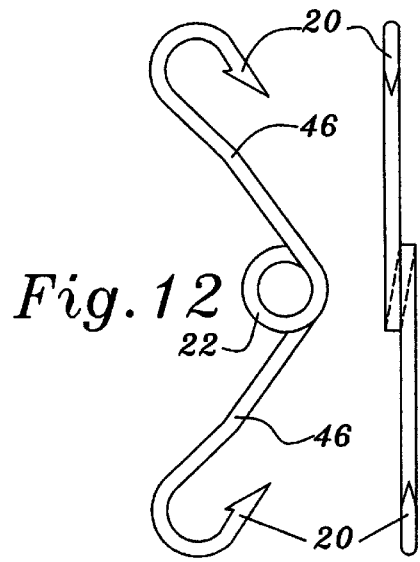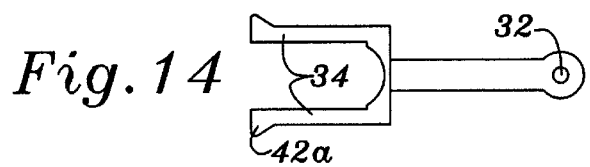

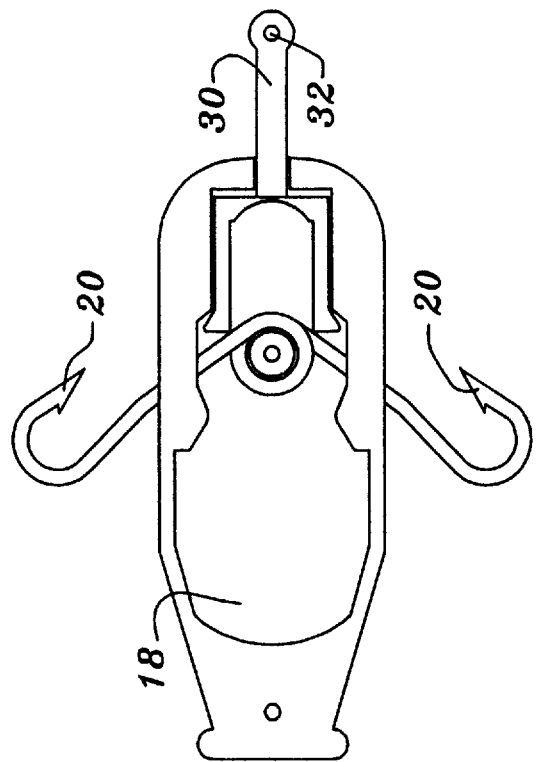
Fig. 15a
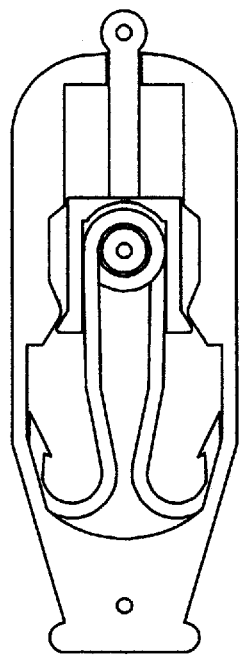
Fig. 15
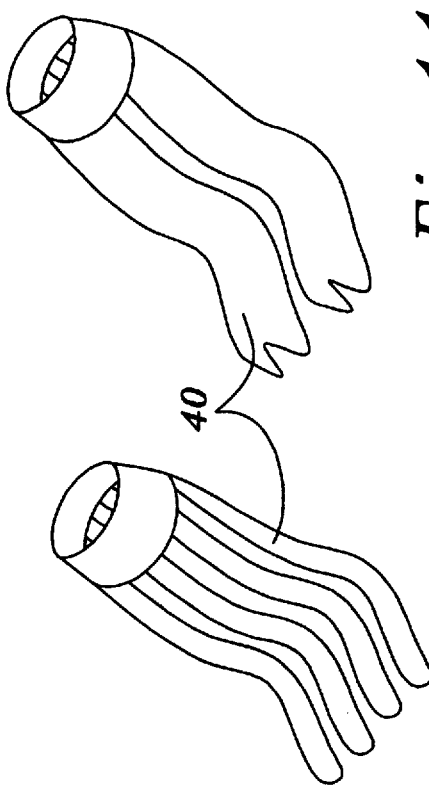
Fig. 11
Fig. 10

DUAL-USE FISHING LURE

CROSS REFERENCE TO RELATED APPLICATIONS

This application is a Continuation-in-Part of application Ser. No. 08/521,136, filed on Aug. 29, 1995 now abandoned.

BACKGROUND OF THE INVENTION

1. Field of the Invention

This invention relates to fishing lures, and in particular to fishing lures having spring-loaded hooks which are retained within the body of the lure until released by a trigger mechanism, and which may be used in a weedless configuration or in a normal configuration. This invention relates to top-water lures as well as to deep-diving lures.

2. Description of the Related Art

All lures of the internal retractable hook design researched during the development of this invention have a single design. This common design incorporates the use of a moveable trigger rod to disengage one or more spring-biased hooks as the body of said lure makes contact with some restraining force and the trigger rod continues its forward movement, causing a disengagement of the spring-biased hooks. However, there seems to be a serious flaw to this design that has yet to be remedied, which is the inability to maintain the hooks in a retracted position during the initial cast. Further it is noted that all prior designs using a moveable trigger rod have failed to address the complex mechanics of forcing a lure of this design to dive, while maintaining hooks and moveable trigger rod in the latched position.

Several varieties of lures with retractable hooks have received U.S. patents. Tomsello (U.S. Pat. No. 3,081,572) discloses a weedless fishing lure having a spring wound around a cross-bar to cause hooks to deploy when released. The release mechanism is a latch which engages a cross bar extending between two hooks, or alternatively engages a tab extending from each hook. Schadell (U.S. Pat. No. 1,890,266) discloses a lure in which a compression spring around a rod biases the hooks toward a retracted position. Bates (U.S. Pat. No. 4,873,781) discloses a lure with moveable hooks; the hooks open outward when pulled forward so that the curved end of the hooks is no longer restrained within a recess. Babbitt (U.S. Pat. No. 1,588,690) discloses a recessed-hook lure with a separate spring for moving the hook to a deployed position. Hodgson, et al. (U.S. Pat. No. 2,884,731) has a pivoting hook with a latching surface on an end of the hook, and a separate spring for deploying the hook. Messinger, Rainey, and Zeman, (U.S. Pat. Nos. 4,562,661; 4,782,618; 3,646,699, respectively) also disclose hooks with separate springs or spring assemblies.

Insofar as I am aware prior art utilizing this design have not been completely satisfactory in that they have involved numerous and complicated internal mechanisms for controlling the hooking action or else production costs, due to design, have been prohibitive.

SUMMARY OF THE INVENTION

Progressive Contribution to the Art

The present invention provides a dual-use fishing lure that is capable of top-water fishing or deep-water fishing. The internal hook design is intended to provide a measure of safety in handling and a relatively snag-free lure. The eyelet, round trigger rod, rectangular latching blade and friction ridge traversing the entire width of the latching blade are intended to provide a simple means of depressing hooks and is part one of a complex latching mechanism. Each hook is formed in one piece, and is coiled into a large spring. Each hook provides a means to be double-anchored, while providing part two of a complex latching mechanism. The lure body is composed of hard plastic, formed in two sections by injection molding. Each section contains specially formed cavities to house hooks and trigger rod. A friction ridge formed to traverse the width of the latching blade cavity is part three of a complex latching mechanism and is intended to hold the trigger rod in place, using the friction ridge atop the trigger rod, and the substantial force furnished by the large spring steel hooks.

Objects of this Invention

The primary objective of this invention is to introduce a retractable hook fishing lure, uncomplicated in design, that can be manufactured and assembled at a practical cost. A lure that consists of five pieces and requires minimal labor to assemble.

Another objective is to provide a dual-use fishing lure, with retractable hooks, which may be used in a weedless configuration or in the regular configuration, with hooks extended, for fishing in clear water or for trolling.

Another objective is to provide a means to easily depress hooks to the interior of the lure. This is accomplished by simply applying forward pressure to trigger rod until latch snaps into place.

Another objective is to provide a unique and durable latching mechanism that will not only depress and hold hooks in the retracted position but will remain latched during the rapidly changing movements required to cast a lure into preferred fish habitat. This is accomplished by molding the body in a specific manner to contain hooks and trigger rod inside, at predetermined and precise distances, allowing the large spring hook to apply pressure to underside of the latching blade, which in turn distributes this force upward by means of the friction ridge atop latching blade, which is in contact with the friction ridge built into the upper body cavity, thereby creating sufficient drag to maintain latched position during a cast.

Another objective is to introduce a retractable hook fishing lure of the moveable trigger rod design that will dive below the surface without disengaging the hook and trigger mechanism. This is accomplished by molding a diving bill or spoon directly below the eyelet attached to the trigger rod, thereby urging the lure to dive while relieving the lure body of the force of drag that is absorbed by the diving bill, the trigger rod, and the angler's line tied to the eyelet.

Further objects are to achieve the above with devices that are sturdy, compact, durable, lightweight, simple, safe, efficient, versatile, and reliable, yet inexpensive and easy to manufacture.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 6 is a side elevation of a hook showing its left-hand twist spring coil, 15° bend in the shank and showing the spring arm.

FIG. 6a is a front view of a hook showing the coils.

FIG. 7 is a side elevation of a hook showing its right-hand twist spring coil, 15° bend in the shank, and the spring arm.

FIG. 7a is a front view of a hook showing the coils.

FIG. 8 is a plan view of the trigger rod.

FIG. 8a is a side elevation of the trigger rod showing a diving bill attached to the eyelet.

FIG. 9 is a plan view of the trigger rod.

FIG. 9a is a front elevation of the trigger rod.

FIG. 10 is an example of a skirt for attaching to the rear end of the lure.

FIG. 11 is an example of a skirt for attaching to the rear end of the lure.

FIG. 12 is a front elevation of a double-ended hook.

FIG. 13 is a right-side elevation of a double-ended hook.

FIG. 14 is a front elevation of a trigger rod having a bifurcated latching arm.

FIG. 15 is a cross section showing a double-ended hook in the retracted position.

FIG. 15a is a cross section showing a double ended hook in the released position.

DESCRIPTION OF THE PREFERRED EMBODIMENTS

Figure 2:
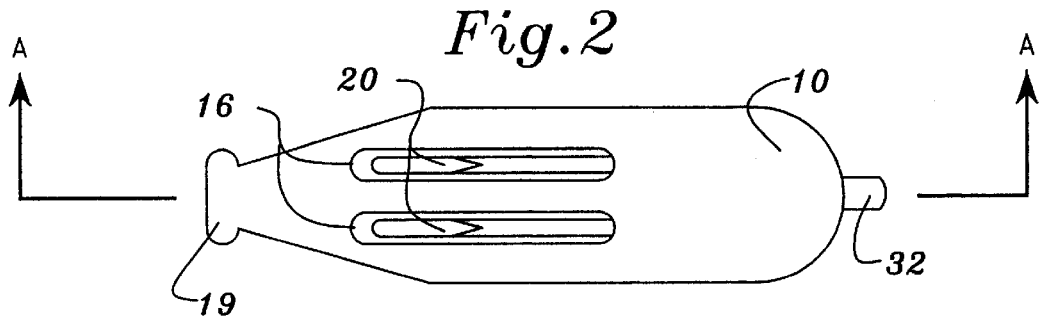
FIG. 2 is a plan view showing the hooks within slotted openings in the lure body.

Referring to FIG. 2, a plan view of this shown fully assembled. The body 10 is torpedo-shaped in this embodiment having two elongated openings 16 which communicate to the exterior. These openings are intended to allow the hooks 20 to reach the exterior while being narrow enough to keep foreign objects from reaching the interior.

Figure 3:
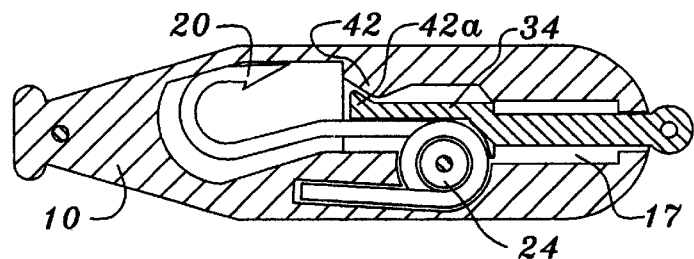
FIG. 3 is section A—A showing a hook in retracted position with the latching blade friction ridge in contact and latched behind the friction ridge of the upper body.
Figure 4:
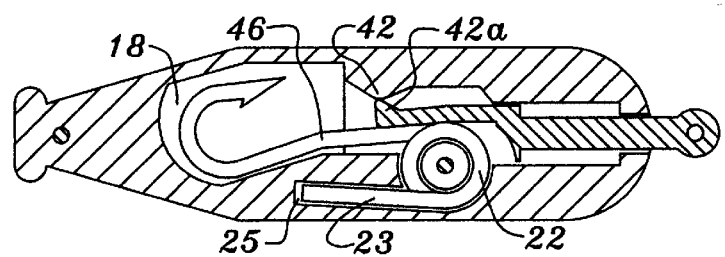
FIG. 4 is showing both friction ridges as they reach their respective vertex with latching blade flexing downward.
Figure 5:
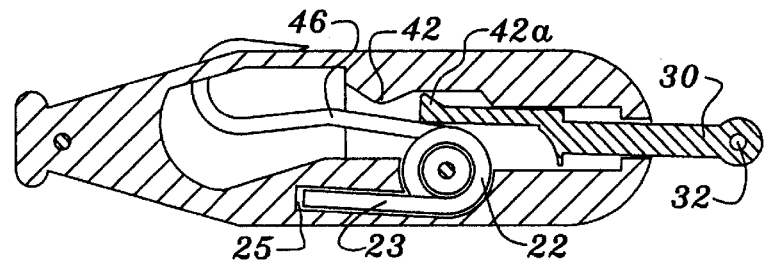
FIG. 5 shows the latching blade as it returns to original shape with friction ridge atop entering the friction ridge release cavity of upper body.
Figure 5A:
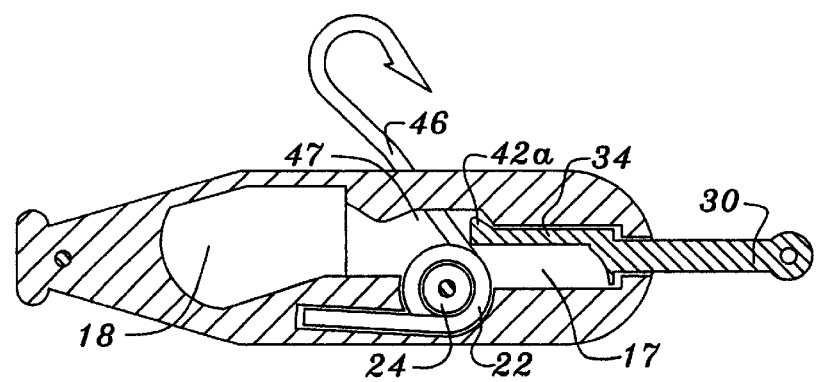
FIG. 5a shows the trigger rod in a forward or released position with a hook in the full extended position and 15° bend in the hook shank outside of body.

Each body section is formed with interior cavities. Each cavity is strategically placed to allow precision movement of internal parts upon assembly. The trigger rod tube 43, shown in FIG. 1 communicates to the exterior and is intended to house the slidably disposed round trigger rod 30, shown in FIGS. 5 and 5a. Referring to FIG. 3, the latching blade cavity 17 is rectangular in shape and is intended to house the latching blade 34 when the trigger rod is fully extended. Referring to FIG. 5a, the friction ridge release cavity 47 is intended to allow the latching blade 34, with the friction ridge 42a atop, to pass freely above the hook support post 24 and the spring coil of hook 22. Referring to FIG. 3, a friction ridge 42 is molded into the lure body and is perfectly placed to mate with the friction ridge 42a of latching blade 34, when hook 20 is in the retracted position. Referring to FIG. 4 the hook cavity 18 is designed to accommodate hook 20 and especially the 15° hook shank bend 46 of hook 20. The angle of body cavity and hook shank bend are intended to fully conceal hooks in a retracted position and allow a small diameter fishing lure. Referring to FIG. 5a, the hook support post 24 is situated below the friction release cavity 47 and is intended to anchor hooks in place as it passes through spring coil 22 of hook 20. Anchor arm cavity 25 will house spring arm 23; see FIG. 4. The arrangement described secures or anchors the hook inside the lure body in two ways; the support post 24 bears part of the stress on the hook when a fish is being played, and the extended arm 23 in the spring arm cavity 25 of the lure body transmits part of the stress to the wall of the lure body. These features cooperate to more evenly distribute stress on the hook and resist hooks from being stripped from the lure during vigorous action. The result is that the entire assembly is stronger and less likely to break.

Figure 1:
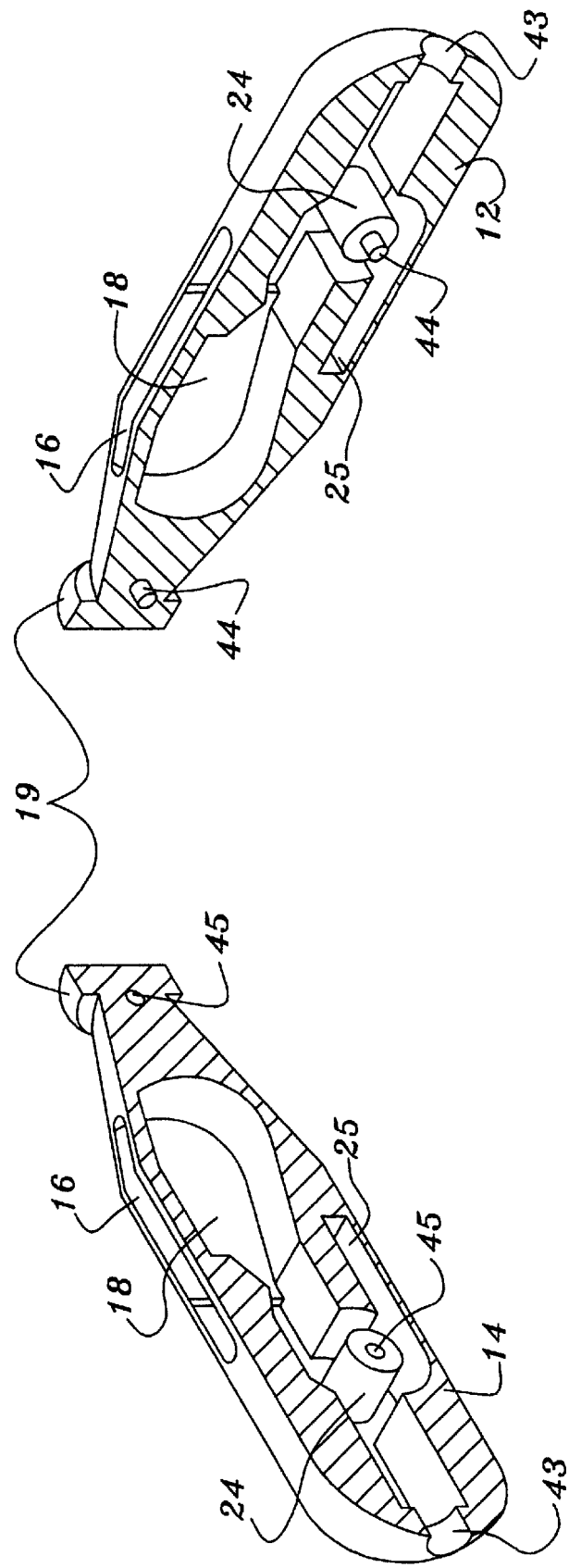
FIG. 1 illustrates the two sections of the lure body.

Referring to FIG. 1, alignment dowels 44 are molded parts of the body and are intended to mate to dowel slot 45 of opposite section to align the two body sections upon assembly. An industrial-strength adhesive will be used to meld the two sections together, thereby eliminating the extra securing devices of previous art, and to simplify the assembly procedure.

Referring to FIGS. 6, 6a, 7, and 7a; the hooks 20 utilized in this invention will be manufactured from a single piece of spring steel, coiled near its center to form a spring coil 22, having a 15° bend 46 on the hook shank in and ending in hook 20. These hooks will be built with a right-hand twist spring coil 22 and a left-hand twist spring coil 22 to better accommodate limited space in anchor arm cavity 25. The 15° bend 46 of hook shank will allow complete concealment of hooks in a retracted position, the ability to utilize small-diameter fishing lures, and a more natural hooking position once the hooks are fully extended through elongate openings 16.

Referring to FIG. 3, hook 20 is seen performing its major function; that of applying a predetermined amount of pressure to the underside of latching blade 34, thereby securing it in the latched position. Referring to FIG. 12, a side elevation is shown of a double-ended hook having a 15° bend 46 on both hook shanks; two hooks 20 and a spring coil 22. This embodiment of hook 20 will perform the same function of applying a predetermined amount of pressure to the underside of bifurcated latching blades 34 to secure them in the latched position; see FIG. 14. Referring to FIGS. 9 and 9a, a plan view and front elevation view are shown of trigger mechanism used with top-water lures. The trigger is molded, by injection, from plastic. Eyelet 32 is integral to trigger rod 30 and provides a means to connect a fishing line to the trigger. The round trigger rod 30 is formed of stiff plastic and is of sufficient diameter to resist bending. Stiffness and toughness of the trigger rod are important, ensuring that the lure does not become damaged and useless because of a trigger rod bend during the strike and struggle of a hooked fish. Trigger rod 30 is integral to latching blade 34. At this point the plastic material changes consistency to become flexible along the length of latching blade 34 to end at friction ridge 42a, once again ridged; see FIG. 3. The latching blade 34 is in a relaxed position with friction ridge 42a mating firmly to the body friction ridge 42 and is held tightly in place by hook 20. Referring to FIG. 4, the trigger mechanism is moved forward showing the friction ridge 42a of latching blade 34 at its vertex with body friction ridge 42. At this precise moment the latching blade 34 is flexed downward, forcing hook bend 46 into contact with lure body 10 as it travels forward. Referring to FIG. 5, the latching blade 34 is once again relaxed as friction ridge 42a enters friction ridge release cavity 47. The unique construction of this trigger, having the ability to flex and to return to its original shape, is critical to the operation of this lure design. Referring to FIG. 14, the trigger mechanism in this embodiment is constructed and performs as stated above. The bifurcated latching blades 34 depress and latch into place the double-ended hooks seen in FIGS. 12 and 13. Referring to FIGS. 8 and 8a, the trigger mechanism in this embodiment is constructed and performs as described above. In addition diving bill 36 is attached at the line end of the trigger rod. A diving bill, as used herein, is defined as a blade or spoon attached at an angle to the line end of the trigger rod, to pull the lure downward as it moves through the water. Because the diving bill is integral with the trigger rod, the force of the water on the lure body is reduced. That is, the bill creates a wake that reduces drag on the lure body, so that most of the drag is on the bill and not on the lure body, thus reducing the likelihood that the trigger will release prematurely due to drag against the water.

Referring to FIGS. 15 and 15a, in this embodiment the double-ended hook is shown in the retracted position and in the fully extended position. When released and extended two hooks extend from either side of the lure as shown in FIG. 15a, making the lure more effective at hooking a striking fish. This embodiment which eliminates the separate spring used in prior art, is possible because the bifurcated latching arm engages the shank of each hook arm and releases each simultaneously when the trigger rod is pulled into the released position.

The lure may have one, two, or more hooks. The hooks, when unlatched, may extend to only one side of the lure, or to two sides.

The exterior of the lure body is colored to resemble a natural prey of game fish, or may be decorated in other color patterns to make it attractive to fish.

The embodiments shown and described above are only exemplary. I do not claim to have invented all the parts, elements, or steps described. Various modifications can be made in the construction, material, arrangement, and operation, and still be within the scope of my invention.

The restrictive description and drawing of the specific examples above do not point out what an infringement of this patent would be, but are to enable one skilled in the art to make and use the invention. The limits of the invention and the bounds of the patent protection are measured by and defined in the following claims.

I claim as my invention:

1. A dual-use fishing lure molded in two sections joined to form a whole, comprising:
    a lure body, said lure body having in a forward portion thereof a trigger rod tube and a trigger rod slidably disposed in said trigger rod tube;
    said lure body having a latching blade cavity with a latching blade disposed therein, said latching blade integral with said trigger rod and said latching blade being flexible in a midsection thereof;
    friction ridge on a rearward portion of said latching blade, said friction ridge being triangular in cross section and having a latching surface angled to an axis of said trigger rod, said latching surface engaging a substantially parallel interior surface of said lure body to hold said at least one hook in said retracted position;
    said lure body having a friction ridge release cavity to allow flexing of said latching blade;
    at least one hook having a barbed end, an anchor arm end, and a spring coil in a central portion thereof, said at least one hook having a retracted position and an extended position;
    at least one hook support post encircled by said spring coil;
    said lure body having a hook cavity for receiving said at least one hook in said retracted position;
    said lure body having at least one slotted opening through which said at least one hook extends when in said extended position; and
    said lure body having at least one anchor arm cavity therein to receive said anchor arm end of said at least one hook, said anchor arm and said barbed end being disposed on opposite sides of said hook support post.

2. The invention as described in claim 1, further comprising:
    said at least one hook having a 15° bend in a shank thereof to facilitate full contact between said at least one hook and said latching blade with said at least one hook in said retracted position so that said spring coil applies a predetermined amount of pressure to said latching blade, said latching blade releasing when sufficient forward tension is applied to said trigger rod to exceed said predetermined amount of pressure.

3. The invention as described in claim 1, further comprising:
    said latching blade being bifurcated; with
    said friction ridge and another friction ridge traversing respectively a width of each bifurcation of said latching blade, so that said each bifurcation of said latching blade latches said at least one hook and another hook separately in said retracted position.

4. The invention as described in claim 1, further comprising:
    said trigger rod having an eyelet at a forward end of said trigger rod,
    a diving bill integral with said eyelet;
    a central portion of said trigger rod being circular in cross section;
    said latching blade being rectangular and located at a rear portion of said trigger rod, wherein said friction ridge traverses an entire width of said latching blade.

5. A dual-use fishing lure, comprising:
    a lure body, said lure body having in a forward portion thereof a trigger rod tube and a trigger rod slidably disposed in said trigger rod tube;
    an eyelet integral with a forward end of said trigger rod;
    a diving bill integral with said eyelet;
    a latching blade integral with a rearward end of said trigger rod, said latching blade having a flexible midsection and being disposed in a latching blade cavity within said lure body;
    a friction ridge on a rearward portion of said latching blade, said friction ridge being triangular in cross section;
    a latching surface on said friction ridge engaging a substantially parallel surface on an interior of said lure body;
    at least one hook having a barbed end, an anchor arm end, and a spring coil in a central portion thereof, said at least one hook having a retracted position and an extended position;
    a shank portion of said at least one hook engaging a surface of said latching blade and exerting sufficient pressure thereon so that said lure can be pulled at a depth greater than ten feet;
    at least one hook support post encircled by said spring coil;
    said lure body having a hook cavity for receiving said at least one hook in a retracted position;

said lure body having one or more slotted openings through which said at least one hook extends when in said extended position; and said lure body having at least one anchor arm cavity therein to receive said anchor arm end of said at least one hook, said anchor arm end and said barbed end being disposed on opposite sides of said hook support post.

* * * * *